(12) United States Patent
Tamura et al.

(10) Patent No.: US 7,724,490 B2
(45) Date of Patent: May 25, 2010

(54) MAGNETIC DISK DEGAUSSING DEVICE AND DEGAUSSING METHOD

(75) Inventors: Hitoshi Tamura, Kanagawa (JP); Hiroki Mori, Kanagawa (JP); Mitsuru Hamaguchi, Kanagawa (JP); Kunihiko Mine, Tokyo (JP); Takehiko Hamaguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 324 days.

(21) Appl. No.: 11/789,575

(22) Filed: Apr. 24, 2007

(65) Prior Publication Data

US 2007/0247776 A1  Oct. 25, 2007

(30) Foreign Application Priority Data

Apr. 24, 2006  (JP) .............................. 2006-118792

(51) Int. Cl.
*H01H 47/00* (2006.01)

(52) U.S. Cl. ........................................ 361/149; 361/143
(58) Field of Classification Search ................. 361/139, 361/143, 149
See application file for complete search history.

(56) References Cited

U.S. PATENT DOCUMENTS 5,574,616 A * 11/1996 Becker et al. ................ 361/149

| 6,594,099 | B2 | 7/2003 | Serizawa |
|---|---|---|---|
| 7,050,256 | B1 * | 5/2006 | Oakley ........................ 360/66 |
| 2002/0163747 | A1 * | 11/2002 | Komatsu et al. .............. 360/17 |
| 2008/0013244 | A1 * | 1/2008 | Schultz et al. ............... 361/149 |

FOREIGN PATENT DOCUMENTS

| JP | 01-173401 | 7/1989 |
|---|---|---|
| JP | 05-266534 | 10/1993 |
| JP | 2004-326960 | 11/2004 |
| JP | 2005-276319 | 10/2005 |

* cited by examiner

*Primary Examiner*—Danny Nguyen
(74) *Attorney, Agent, or Firm*—Townsend and Townsend and Crew LLP; John Henkhaus

(57) ABSTRACT

Embodiments in accordance with the present invention provide a degaussing device and a degaussing method capable of efficiently degaussing a magnetic disk, especially, a magnetic disk of the perpendicular magnetic recording system, without resorting to a magnetic field of a high intensity. Embodiments in accordance with the present invention provide a degaussing method of degaussing a magnetic disk not yet installed in a magnetic disk drive by applying an external magnetic field to the magnetic disk by a degaussing device. In accordance with one embodiment, the method includes disposing the magnetic disk in the degaussing device such that the direction of an external magnetic field is inclined at an angle to the axis of easy magnetization of the magnetic disk.

18 Claims, 12 Drawing Sheets

MAGNETIC DISK DEGAUSSING DEVICE AND DEGAUSSING METHOD

CROSS-REFERENCE TO RELATED APPLICATION

The instant nonprovisional patent application claims priority to Japanese Application No. 2006-118792, filed Apr. 24, 2006 and incorporated by reference in its entirety herein for all purposes.

BACKGROUND OF THE INVENTION

Increase of the error rate in a data area attributable to a leakage magnetic field created by the residual magnetism of a magnetic disk is a problem in magnetic recording. In the perpendicular magnetic recording system, in particular, the influence of residual magnetism on the magnetic head is significant and hence the foregoing problem is important. The problem attributable to residual magnetism has become more important with the increasing demand for the perpendicular magnetic recording system.

For example, the residual magnetism of magnetic disks of the in-plane magnetic recording system and the perpendicular magnetic recording system is removed by an AC degaussing method. When the AC degaussing method is applied to degaussing, for example, a magnetic disk of the in-plane magnetic recording system, a magnetic field is applied in an in-plane direction parallel to the axis of easy magnetization of the recording layer of the magnetic disk with a permanent magnet or an electromagnet to invert the direction of the magnetic field so that the magnetism may be gradually reduced.

The residual magnetism of a magnetic disk of the perpendicular magnetic recording system is removed by applying magnetic fields of opposite polarities in a direction perpendicular to the surface of the magnetic disk, i.e., a direction parallel to the axis of easy magnetization of the recording layer of the magnetic disk, to invert the magnetism of the recording layer repeatedly so that the magnetism of the recording layer may gradually approach zero.

A data erasing method disclosed in Japanese Patent Publication No. 201-331904 ("Patent document 1") combines magnets such that magnetic poles of opposite polarities are adjacent to each other and erases data recorded on the magnetic disk by leakage flux from the interface between the magnetic poles of opposite polarities. A data erasing device disclosed in Japanese Patent Publication No. 2005-276319 ("Patent document 2") applicable to magnetic disks respectively of both the in-plane and the perpendicular magnetic recording system, uses a magnetic field varying from perpendicular direction at the inner circumference of the disk to a parallel direction at the outer circumference of the disk. A magnetic field applying method disclosed in Japanese Patent Publication No. 2004-326960 ("Patent document 3") places magnets opposite to the upper and the lower surface of a magnetic disk, respectively, and slides the magnets along the recording surface of the magnetic disk.

A magnetic field of a magnetic intensity not lower than the coercive force of the magnetic disk is needed to degauss the magnetic disk. However, the recent magnetic recording systems including the perpendicular magnetic recording systems records data in a high recording density on magnetic disks and hence the coercive force of magnetic disks has been increased. Accordingly, a magnetic field of a high magnetic intensity needs to be applied to the magnetic disk for high-density recording. For example, it is difficult to degauss a magnetic disk of the perpendicular magnetic recording system by applying a magnetic field of the same magnetic intensity as that of a magnetic field used by a degaussing device for degaussing a magnetic disk of the in-plane magnetic recording system by a degaussing device similar to the degaussing device for the in-plane magnetic recording system.

BRIEF SUMMARY OF THE INVENTION

Embodiments in accordance with the present invention provide a degaussing device and a degaussing method capable of efficiently degaussing a magnetic disk, especially, a magnetic disk of the perpendicular magnetic recording system, without resorting to a magnetic field of a high intensity. Particular embodiments provide a degaussing method for degaussing a magnetic disk not yet installed in a magnetic disk drive by applying an external magnetic field to the magnetic disk by a degaussing device. An embodiment of the method includes disposing the magnetic disk in the degaussing device such that the direction of an external magnetic field is inclined at an angle to the axis of easy magnetization of the magnetic disk.

DETAILED DESCRIPTION OF THE INVENTION

Figure 1:
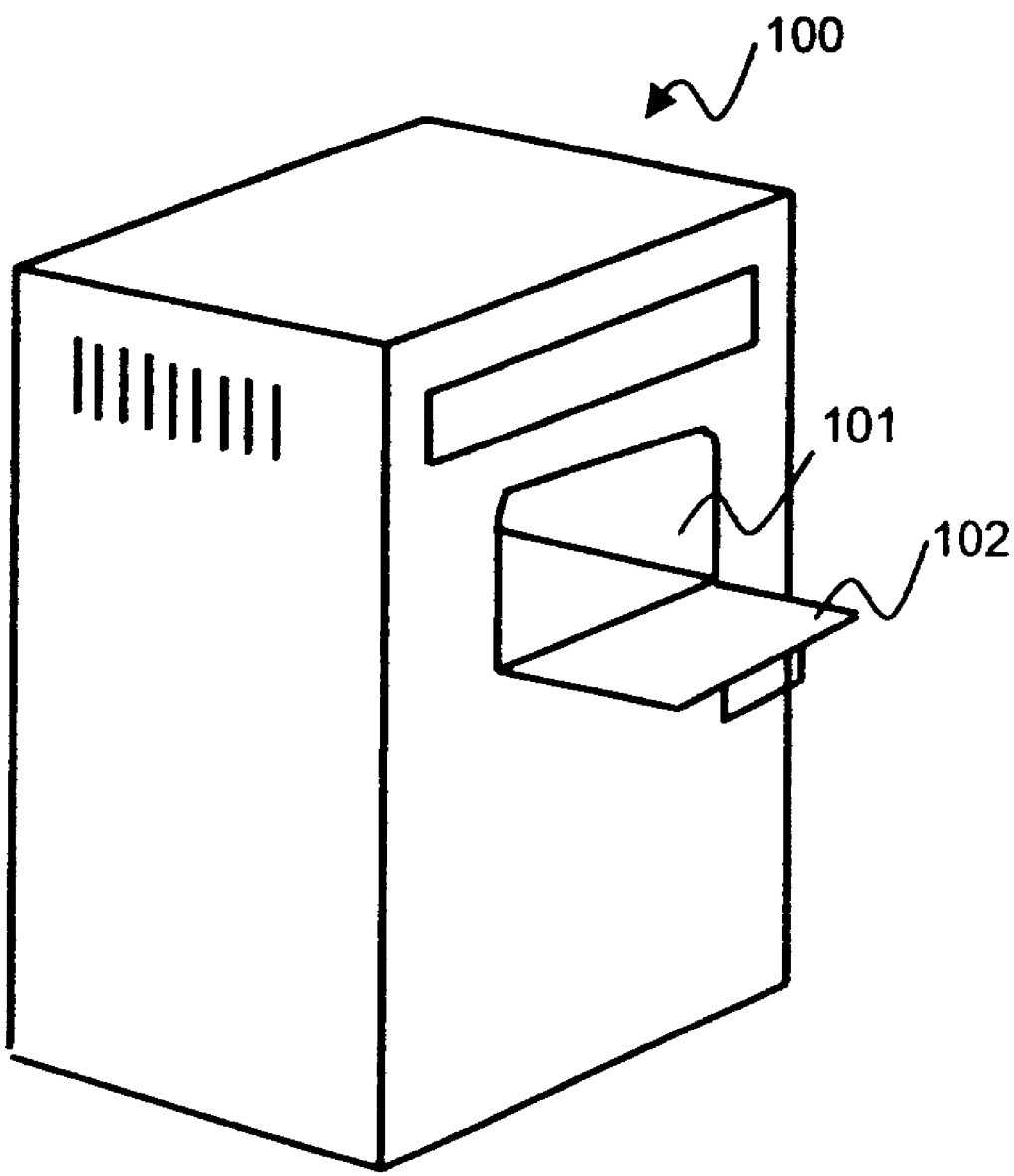
FIG. 1 is a perspective view of a degaussing device 100 in a first embodiment according to the present invention.

Embodiments in accordance with the present invention relate to a degaussing device for and a degaussing method of removing residual magnetism from a magnetic disk. It is an object of embodiments in accordance with the present invention to degauss a magnetic disk efficiently. More particularly, it is an object of embodiments in accordance with the present invention to provide a degaussing device and a degaussing method capable of efficiently degaussing a magnetic disk of the perpendicular recording system without resorting to a magnetic field of a high magnetic intensity.

A method for degaussing a magnetic disk before being incorporated into a magnetic disk drive by applying an external magnetic field to the magnetic disk by a degaussing device, includes, disposing the magnetic disk in the degaussing device such that the direction of an external magnetic field is inclined at an angle to the axis of easy magnetization of the magnetic disk.

Embodiments of the present invention provide a degaussing device for degaussing a magnetic disk including a magnetic field applying means for applying an external magnetic field to the magnetic disk, a support means for supporting the magnetic disk, and a tilting means for tilting the support means relative to the direction of the external magnetic field.

Embodiments of the present invention are capable of efficiently degaussing a magnetic disk without resorting to a magnetic field of a high magnetic intensity.

Various embodiments in accordance with the present invention will be described. Proper omission and simplification will be made in the following description and the accompanying drawings to make the description clear. In the accompanying drawings, like parts are designated by the same reference characters and the repetitive description thereof will be omitted when necessary to avoid duplication.

FIG. 1 is a perspective view of a degaussing device 100 in accordance with a first embodiment of the present invention. The degaussing device 100 is provided in its central part with a magnetic disk holding unit 101 covered with a door 102. The door 102 is opened, magnetic disks, not shown, are put in the magnetic disk holding unit 101, the door 102 is closed, and then the degaussing device 100 is operated. The magnetic disk holding unit 102 is formed in a size sufficient for holding twenty-five magnetic disks.

Figure 2:
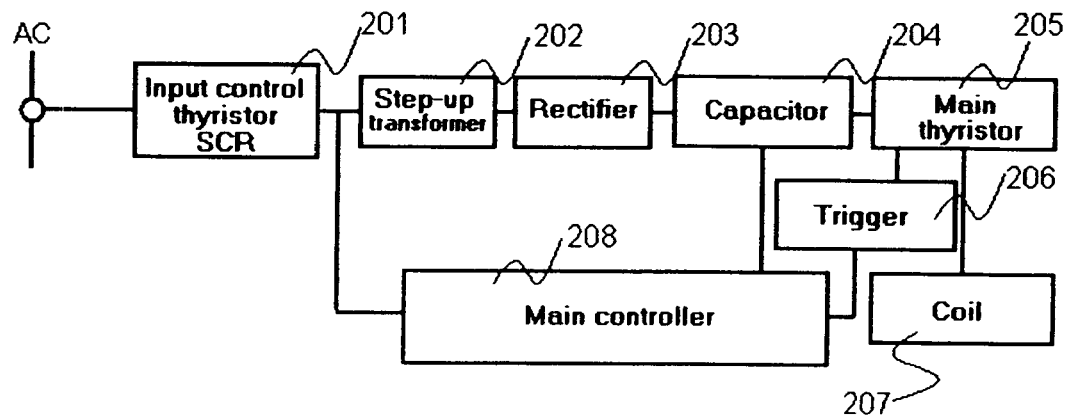
FIG. 2 is a block diagram of a control system for controlling the degaussing device 100 in the first embodiment.

FIG. 2 is a block diagram of a control system for controlling the degaussing device 100 in the first embodiment. A main controller 208 detects a current supplied to an input control thyristor 201 by an ac power source. A step-up transformer 202 raises the voltage of the current and a rectifier 203 rectifies the current to charge a capacitor 204. The main controller 208 measures the voltage of the charged capacitor 204. The main controller 208 drives a trigger 206 to turn on the main thyristor 205 upon the increase of the voltage of the capacitor 204 to a predetermined voltage. When the main thyristor 205 is turned on the electricity accumulated in the capacitor 204 is discharged and a current is supplied to an oil 207.

Figure 3:
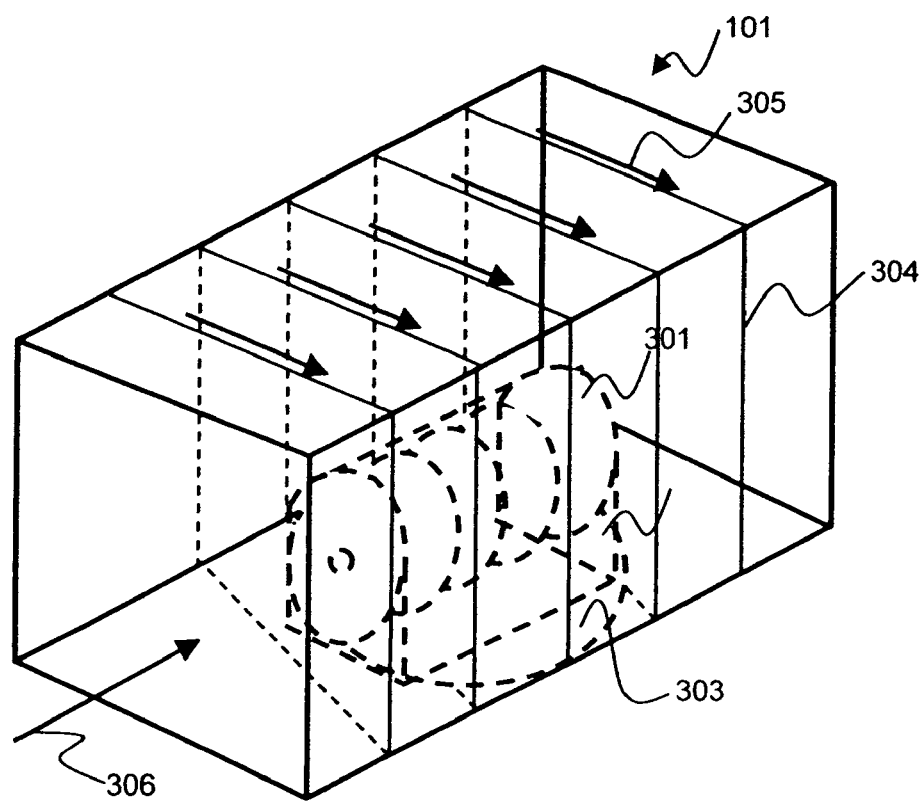
FIG. 3 is a perspective view of a magnetic disk holding unit 101 included in the degaussing device 100 in the first embodiment.
Figure 3:
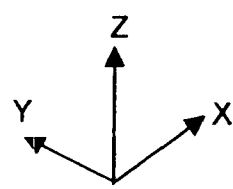

FIG. 3 is a perspective view of the magnetic disk holding unit 101 of the degaussing device 100 according to the first embodiment. The magnetic disk holding unit 101 has a capacity sufficient for entirely covering the magnetic disks. Thus the entire surfaces of the magnetic disks can be simultaneously degaussed. A coil 304 is wound such that a disk caddy 302 made of a nonconductive material and capable of holding a plurality of magnetic disks 301 can be contained in the magnetic disk holding unit 101. A current 301 flows through the coil 304 in a direction opposite the Y-direction parallel to the Y-axis shown in FIG. 3. Consequently, a magnetic field 306 is applied in the X-direction parallel to the X-axis shown in FIG. 3 to the magnetic disk holding unit 101. The disk caddy 302 is mounted on a table 303 disposed in the magnetic disk holding unit 101.

Figure 11:
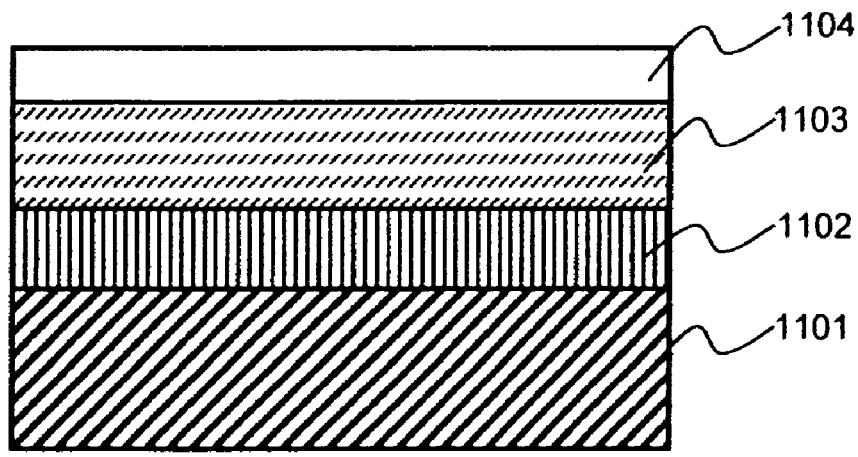
FIG. 11 is a sectional view of a magnetic disk of the perpendicular magnetic recording system.
Figure 12:
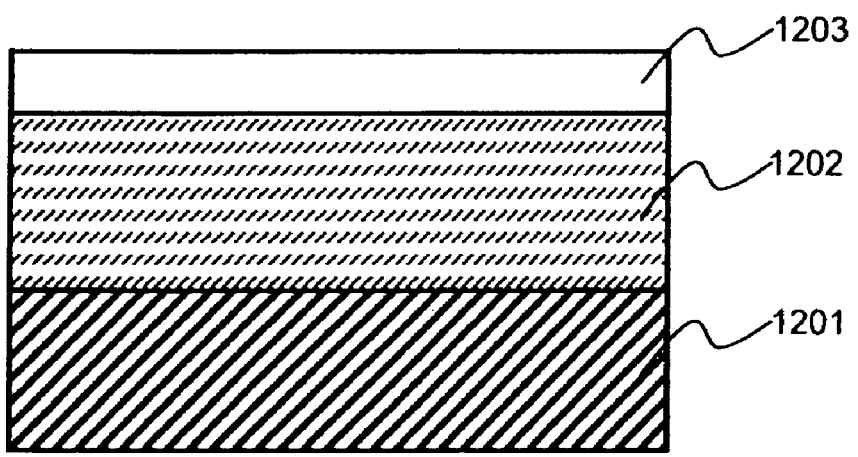
FIG. 12 is a sectional view of a magnetic disk of the in-plane magnetic recording system.

FIG. 11 is a sectional view of a magnetic disk of the perpendicular magnetic recording system and FIG. 12 is the in-plane magnetic recording system. As shown in FIG. 11, the magnetic disk of the perpendicular magnetic recording system has a soft magnetic layer 1102, a hard magnetic recording layer 1103 and a nonmagnetic protective layer 1104 superposed in that order on a nonconductive substrate 1101. The axis of easy magnetization of the recording layer 1103 is perpendicular to the surface of the magnetic disk.

As shown in FIG. 12, the magnetic disk of the in-plane recording system has a hard magnetic recording layer 1202 and a nonmagnetic protective layer 1203 superposed in that order on a nonmagnetic substrate 1201. The axis of easy magnetization of the recording layer 1202 is parallel to the surface of the magnetic disk.

The degaussing device 100 is used for degaussing magnetic disks of the perpendicular magnetic recording system. Magnetic disks 301 are loaded on the disk caddy 302. The disk caddy 302 can carry one or a plurality of magnetic disks 301. The disk caddy 302 can hold the magnetic disks 301 with their surfaces extended perpendicularly to the surface of the table 303. Preferably, the magnetic disks 301 are those before being incorporated into magnetic disk drives. An external magnetic field can be applied to the magnetic disk 301 without being obstructed by the casing of a magnetic disk drive and hence the magnetic disk can be more efficiently degaussed. Thus the magnetic disk drive can be efficiently assembled by the following magnetic disk drive assembling process.

Figure 5:
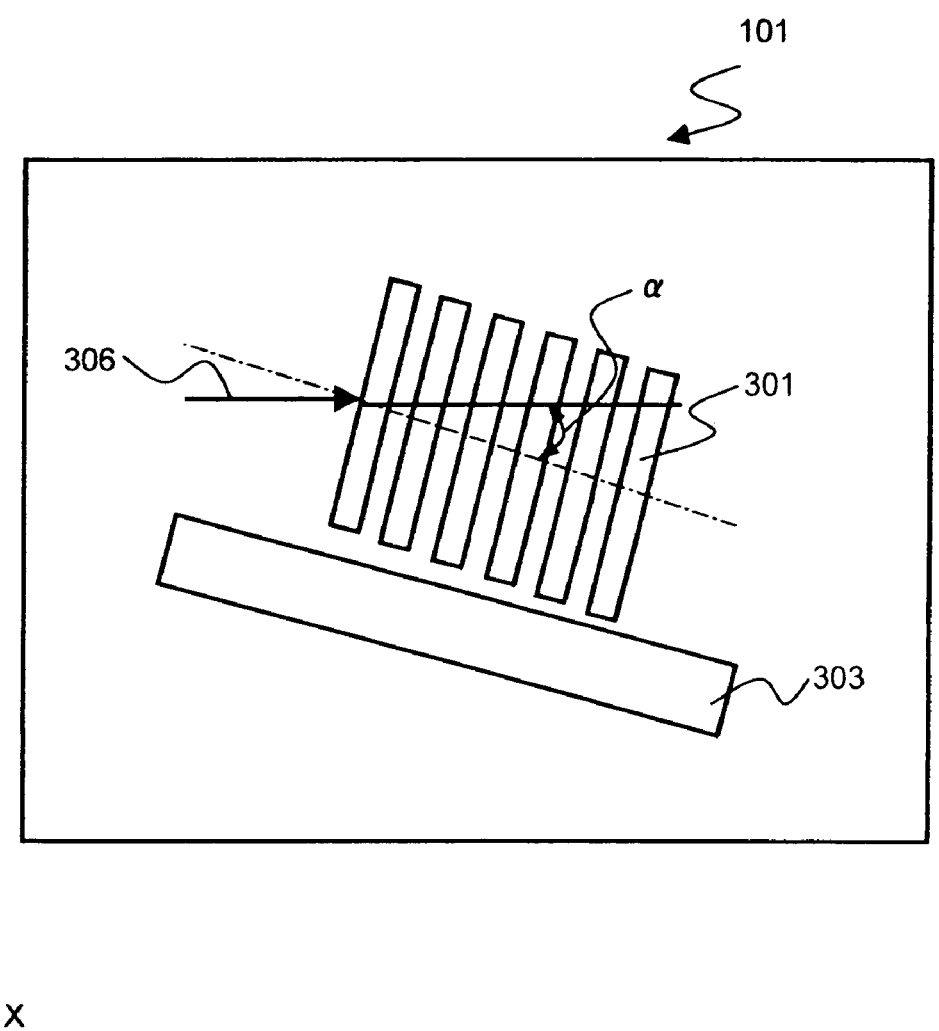
FIG. 5 is a sectional view of the degaussing device in the first embodiment taken from the Y-direction.

FIG. 5 is a sectional view of the degaussing device 100 in the first embodiment taken from the Y-direction. As shown in FIG. 5, the table 303 of the magnetic disk holding unit 101 is tilted to tilt the magnetic disks 301 loaded on the disk caddy, not shown in FIG. 5, at a predetermined angle to the magnetic field 306 applied to the magnetic disks 301 by the degaussing device 100. Whereas the angle between the axis of easy magnetization of the magnetic disks 301 and the direction of the applied magnetic field 306 is 0° in the conventional degaussing device, the angle between the axis of easy magnetization of the magnetic disks 301 and the direction of the applied magnetic field 306 is α in the degaussing device 100 in the first embodiment.

Figure 6:
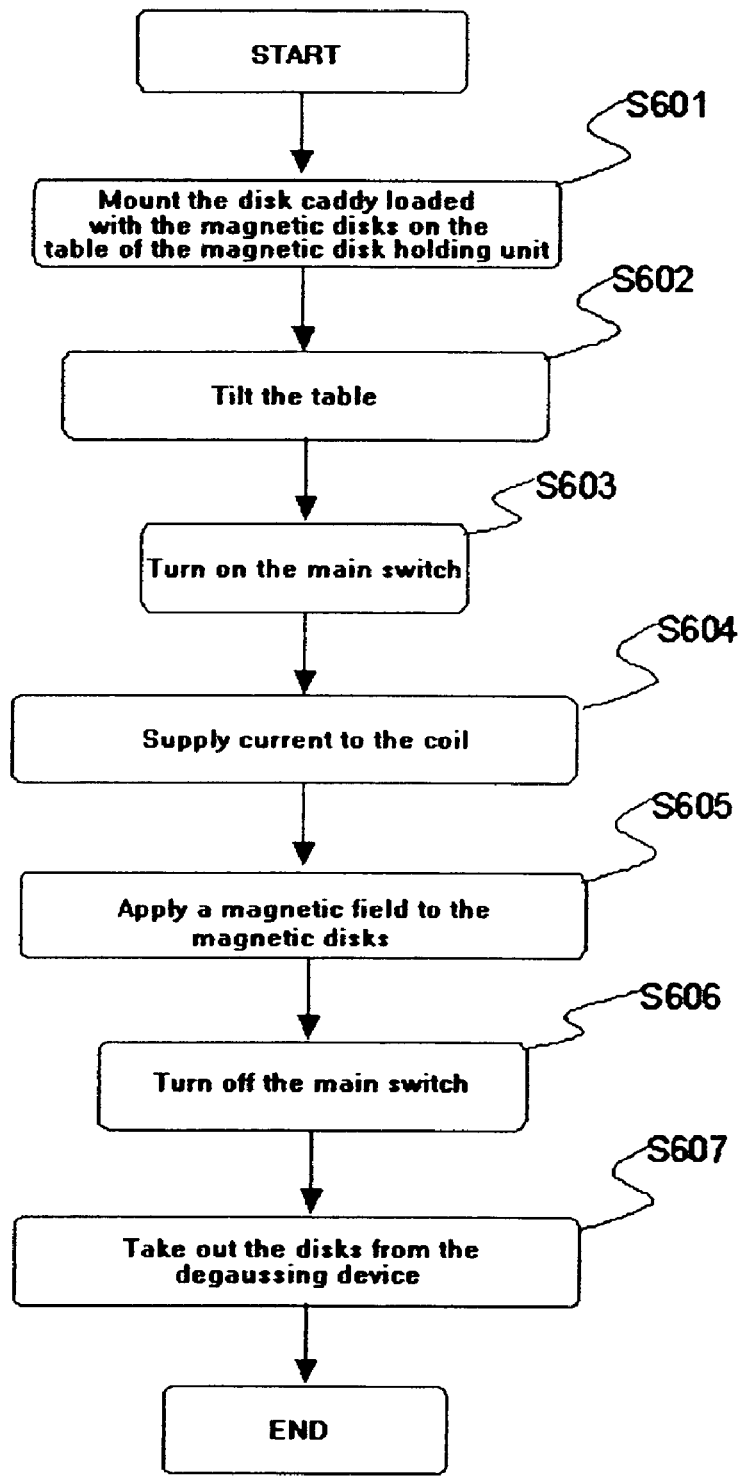
FIG. 6 is a flow chart of a degaussing method to be carried out by the degaussing device in the first embodiment.

FIG. 6 is a flow chart of a degaussing method to be carried out by the degaussing device 100 in the first embodiment. The degaussing method will be described with reference to FIGS. 1, 3 and 5. Magnetic disks 301 are loaded on the disk caddy 302. The disk caddy 302 loaded with the magnetic disks 301 is mounted on the table 303 of the magnetic disk holding unit 101 in step S601. Then, the table 303 is tilted relative to the X-axis shown in FIG. 3 or 5 by a tilting mechanism, not shown, in step S602 to tilt the magnetic disks 302 relative to the X-axis. Subsequently, a main switch is turned on to connect the degaussing device 100 to the power source in step S603 and a current is supplied to the coil 304 in step S604. Consequently, the coil 304 creates the magnetic field 306. A time for which a current is supplied to the coil 304 for degaussing is, for example, 10 ms. The application of the magnetic field 306 is terminated in step S605, and then the main switch is turned off to disconnect the degaussing device 100 from the power source in step 606. Then, the disk caddy 302 holding the magnetic disks 301 is taken out from the degaussing device 100 in step S607.

Figure 13:
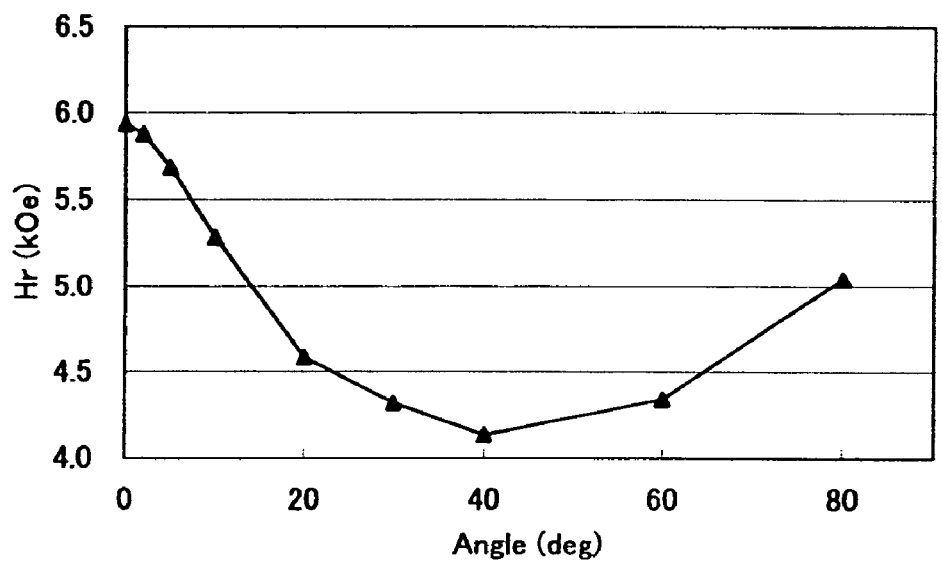
FIG. 13 is a graph showing the relation between the intensity $H_o$ of a magnetic field to be applied to the magnetic disk by the degaussing device and the angle between the axis of easy magnetization of the magnetic disk and the direction of the applied magnetic field.

FIG. 13 is a graph showing the relation between the intensity of the magnetic field to be applied to the magnetic disk 301 by the degaussing device 100 and the angle between the axis of easy magnetization of the magnetic disk 301 and the direction of the applied magnetic field. As obvious from FIG. 13, the magnetic disk 301 can be degaussed by a magnetic field having an intensity of 6 kOe or below when the angle between the axis of easy magnetization and the direction of the applied magnetic field is between 5° and 80°. The intensity of the magnetic field necessary for degaussing when the angle is 40° is about two-thirds of that of the magnetic field necessary for degaussing when the angle is 0°.

Generally, the axis of easy magnetization of the recording layer of a magnetic disk of the in-plane magnetic recording system is parallel to the surface of the magnetic disk, and the axis of easy magnetization of the recording layer of a magnetic disk of the perpendicular magnetic recording system is perpendicular to the surface of the magnetic disk. The coercive force of a magnetic disk is defined by the intensity of a magnetic field to be applied to the magnetic disk in a direction parallel to the axis of easy magnetization to reduce the magnetism to zero. Therefore, a magnetic field having an intensity sufficiently higher than the coercive force of the magnetic disk needs to be, applied to the magnetic disk for degaussing. FIG. 13 shows that there is a tendency for the effective coercive force of the magnetic disk to decrease relative to a magnetic field inclined to the axis of easy magnetization of the recording layer.

Therefore, the magnetic disks can be degaussed by a magnetic field having a comparatively low intensity when the table 303 shown in FIG. 5 is tilted such that the angle between the direction of the magnetic field applied to the magnetic disks by the degaussing device and the axis of easy magnetization of each of the magnetic disks is between 5° and 80°. Desirably, the table 303 is tilted such that the angle between the direction of the magnetic field applied to the magnetic disks by the degaussing device and the axis of easy magnetization of each of the magnetic disks is 45° to achieve degaussing the magnetic disks by a magnetic field of a low intensity.

Figure 7:
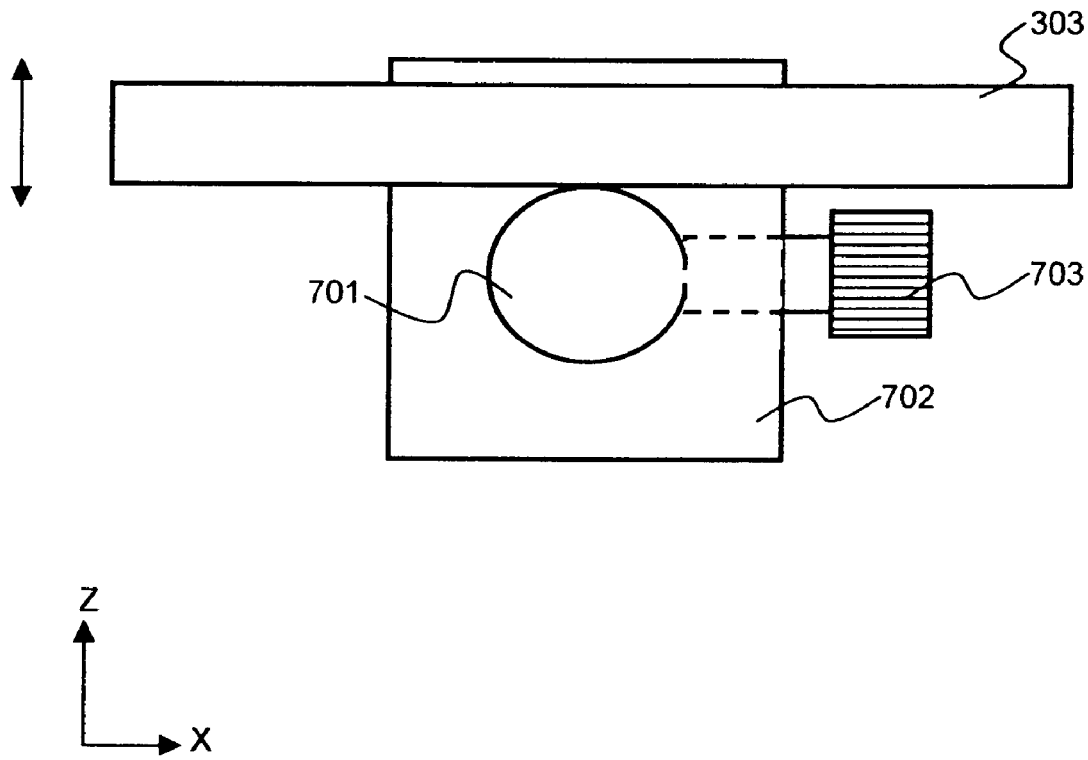
FIG. 7 is a view of a tilting mechanism for the degaussing device shown in FIG. 3 or 5.

A tilting mechanism for the degaussing device shown in FIG. 3 or 5 is shown in FIG. 7 by way of example. As shown in FIG. 7, the table 303 is supported on an arm 701 held by an arm holder 702. The arm 701 is cylindrical and is capable of turning about its axis. The table 303 supported on the arm 701 is tilted along the z-axis shown in FIG. 7 when the arm 701 turns. The arm 701 is fixed with a fixing screws 703 to hold the table 303 at a predetermined inclination.

Figure 8:
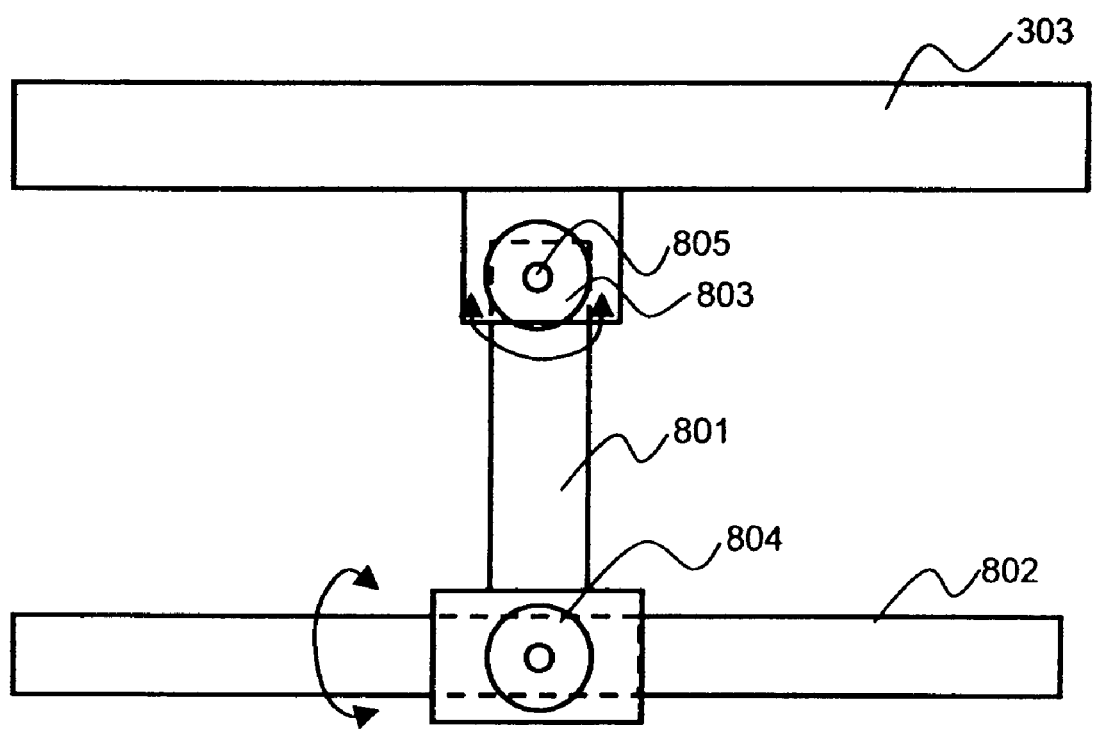
FIG. 8 is a view of another tilting mechanism for the degaussing device shown in FIG. 3 or 5.

Another tilting mechanism for the degaussing device shown in FIG. 3 or 5 is shown in FIG. 8 by way of example. As shown in FIG. 8, the table 303 is supported on an arm 801 by supporting the table 303 on a support 805 and fixing the table 303 to the support 805. The arm 801 is connected to an arm 802 capable of turning about an axis parallel to the X-axis shown in FIG. 8 to turn the table 303 about an axis parallel to the X-axis. The table 303 is turned on the support 805 about an axis parallel to the Y-axis. The arms 801 and 802 are fixed with fixing screws 803 and 804 to hold the table 303 at a predetermined inclination. Since the table 303 can be turned about the two axes, the angle between the direction of the applied magnetic field and the axis of easy magnetization of the magnetic disk can be easily adjusted.

Figure 10:
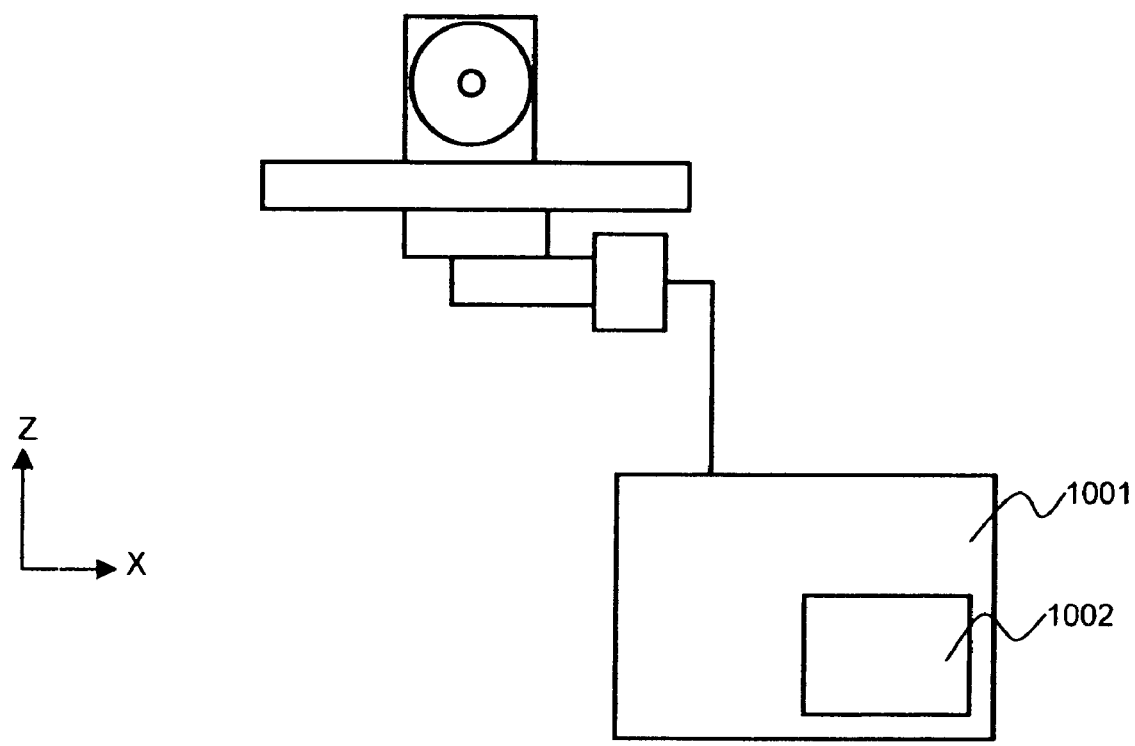
FIG. 10 is a view of a third tilting mechanism for the degaussing device shown in FIG. 3 or 5.

A third tilting mechanism for the degaussing device shown in FIG. 3 or 5 is shown in FIG. 10. Each of the tilting mechanisms shown in FIGS. 7 and 8 uses the fixing screws to hold the table 303 at a predetermined inclination. The tilting mechanism shown in FIG. 10 is controlled by a controller 1001 to adjust the inclination of the table 1002 automatically to a predetermined inclination. As shown in FIG. 10, the controller 1001 includes a position adjusting unit 1002. The controller 1001 controls the inclination of the table 303 automatically according to a numerical value indicating an angle given to the position adjusting unit.

Figure 4:
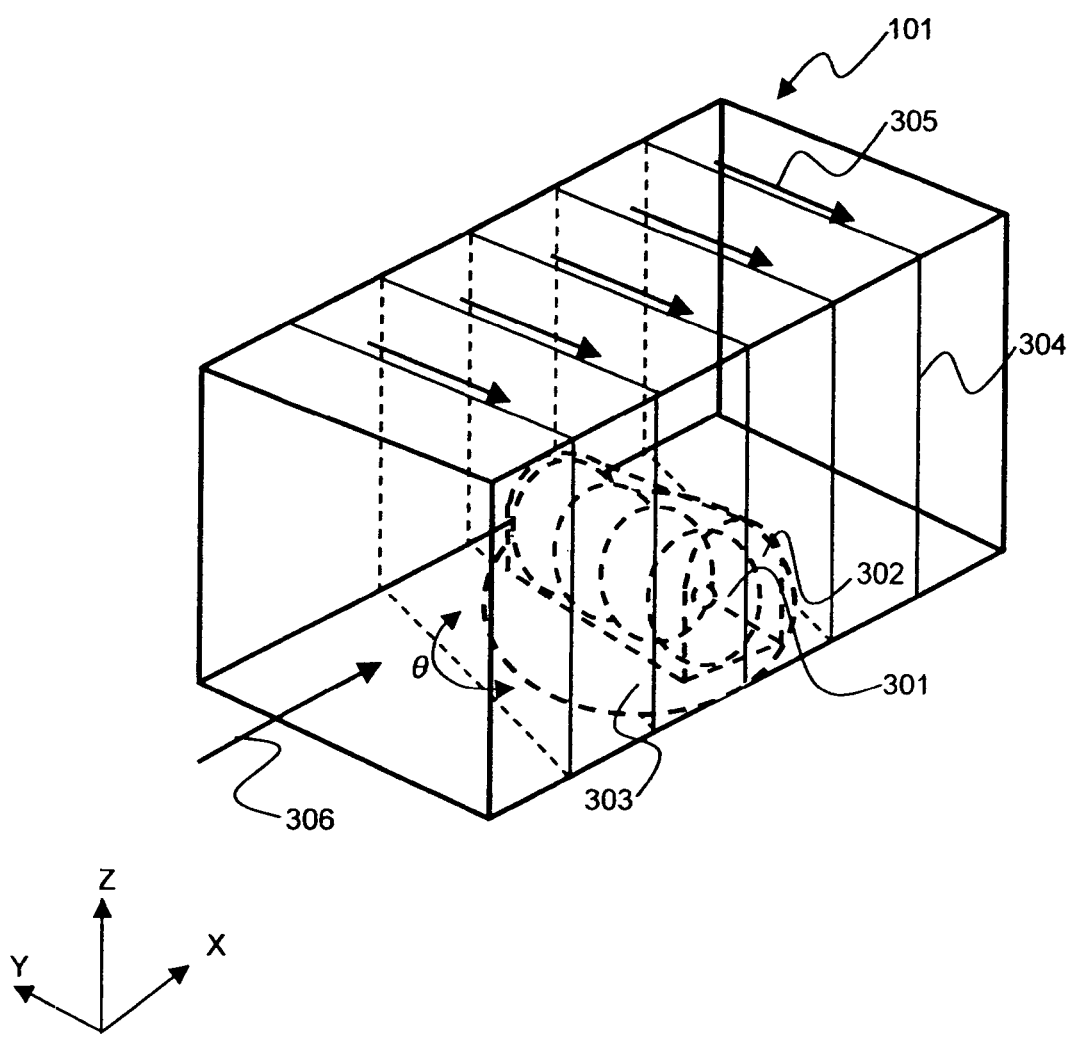
FIG. 4 is a perspective view of a magnetic disk holding unit included in a degaussing device in a second embodiment according to the present invention.

FIG. 4 is a perspective view of a magnetic disk holding unit 101 included in a degaussing device in a second embodiment according to the present invention. The basic construction of the degaussing device in the second embodiment is the same as that of the degaussing device in the first embodiment. The degaussing device in the second embodiment is applied to degaussing a magnetic disk of the in-plane magnetic recording system show in FIG. 12. As mentioned above, the axis of easy magnetization of the magnetic disk of the in-plane magnetic recording system is parallel to the surface of the magnetic disk. Therefore, first the magnetic disks 301 are mounted on the table 303 such that the direction of a magnetic field 306 to be applied to the magnetic disks 301 by the degaussing device will be parallel to the axes of easy magnetization of the magnetic disks, the table 303 is tilted by the tilting method by which the degaussing device in the first embodiment tilted the table 303, and then, the magnetic disks are degaussed.

In the degaussing device in the first embodiment, the directional relation between the axis of easy magnetization of each magnetic disk 301 and the magnetic field 306 to be applied to the magnetic disks 301 by the degaussing device can be adjusted simply by properly changing the direction in which the magnetic disks 301 contained in the disk caddy 302 are mounted on the table 303 by a manual operation. When a turning mechanism is combined with the table 303 to turn the table 303, the table 303 can be turned in the directions θ for fine adjustment. Thus, the degaussing device can degauss magnetic disks of either of the perpendicular magnetic recording system or the in-plane magnetic recording system.

Figure 9:
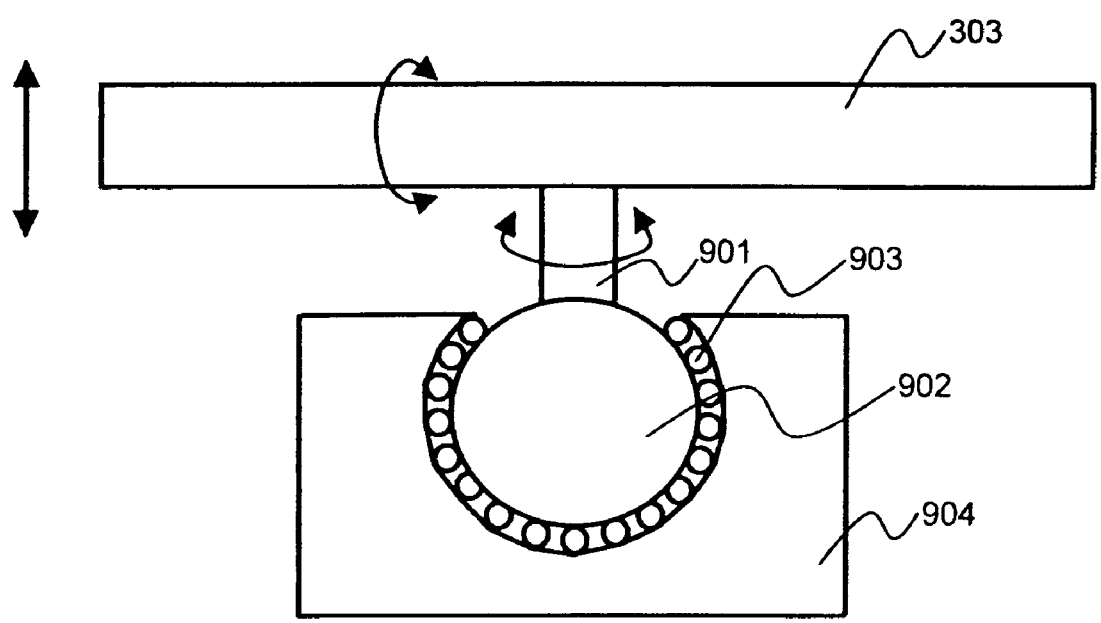
FIG. 9 is a view of a turning mechanism for the degaussing device shown in FIG. 4.

FIG. 9 shows a turning mechanism for the degaussing device shown in FIG. 4 by way of example. As shown in FIG. 9, the table 303 is supported on an arm 901 having one end connected to a ball 902. The ball 902 is held by a bearing 903 on a ball holder 904. The ball 902 can turn in the bearing 903 about the Y-axis to turn the table 302 in the directions θ. The ball 902 can turn in all directions, so that the table 303 can be tilted in an optional direction.

Figure 14:
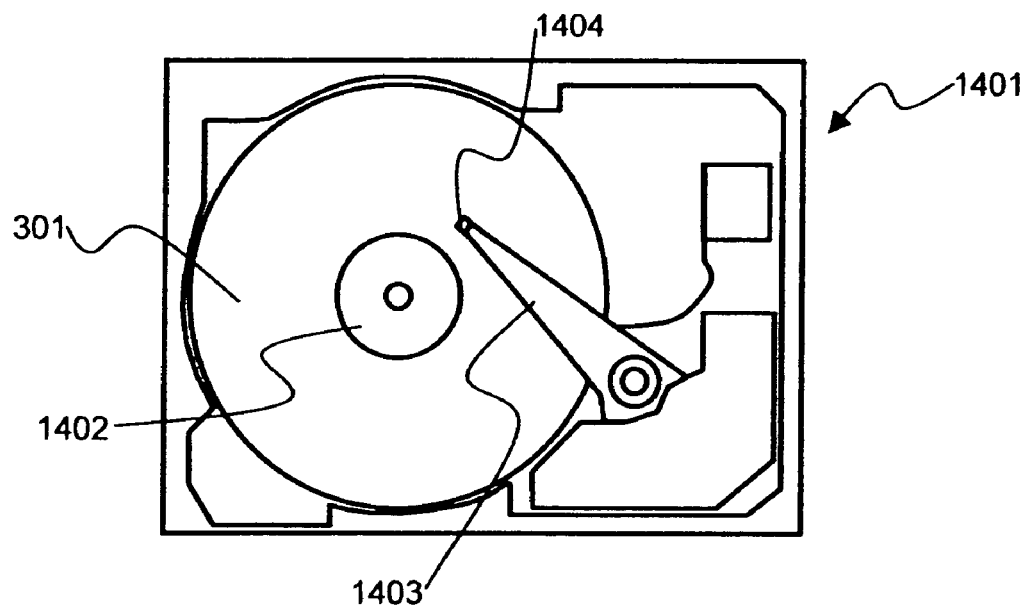
FIG. 14 is a typical view of a magnetic disk drive 1401 provided with a magnetic disk 301.

The foregoing degaussing devices can be applied to degaussing a magnetic disk 301 installed in a magnetic disk drive. FIG. 14 is a typical view of a magnetic disk drive 1401 provided with a magnetic disk 301. The magnetic disk drive 1401 includes a spindle motor 1402 for rotatively driving the magnetic disk 301, and a suspension 1403 having an end part on which a magnetic head 1404 for reading information from and writing information to the magnetic disk 301. The degaussing device disposed outside the magnetic disk drive 1401 applies a magnetic field 306 to the magnetic disk 301 being rotated by the spindle motor 1402 for ac degaussing.

Although the degaussing devices in the preferred embodiments according to the present invention have been described by way of example, the present invention is not limited thereto in its practical application. One of skill in the art would understand that various changes may be made in the elements of the foregoing embodiments without departing from the scope of the present invention.

What is claimed is:

1. A degaussing method of degaussing a magnetic disk not yet installed in a magnetic disk drive by applying an external magnetic field to the magnetic disk by a degaussing device, said degaussing method comprising:
   disposing the magnetic disk in the degaussing device such that the direction of an external magnetic field axis is inclined at an angle to the axis of easy magnetization of the magnetic disk; and
   applying the external magnetic field of an intensity to degauss the magnetic disk.

2. The degaussing method according to claim 1, wherein a plurality of magnetic disks are degaussed simultaneously.

3. The degaussing method according to claim 1, wherein the angle is between 50 and 80°.

4. The degaussing method according to claim 1, wherein the angle is 40°.

5. The degaussing method according to claim 1, wherein the magnetic disk is a perpendicular magnetic recording medium.

6. The degaussing method according to claim 1, wherein the external magnetic field is created by an electromagnet included in the degaussing device.

7. The degaussing method according to claim 2, wherein the magnetic disks are contained in a carrier made of a nonconductive material.

8. The degaussing method according to claim 7, wherein the carrier is mounted on a magnetic disk support member included in the degaussing device.

9. The degaussing method according to claim 8 further comprising tilting the magnetic disk support member relative to the direction of the magnetic field.

10. A degaussing device for degaussing a magnetic disk, said degaussing device comprising:
    means for applying an external magnetic field to the magnetic disk for degaussing the magnetic disk;
    a means for supporting the magnetic disk; and
    a means for tilting the means for supporting the magnetic disk relative to the direction of the external magnetic field.

11. The degaussing device according to claim 10, wherein the means for applying an external magnetic field is an electromagnet.

12. The degaussing device according to claim 10, wherein a plurality of magnetic disks are degaussed simultaneously.

13. The degaussing device according to claim 10, wherein the means for supporting the magnetic disk has a support surface on which the magnetic disk is placed, and the magnetic disk is placed on the support surface with its surface extended perpendicularly to the support surface.

14. The degaussing device according to claim 10, wherein the magnetic disk is a perpendicular magnetic recording medium.

15. The degaussing device according to claim 10, wherein the means for tilting the means for supporting the magnetic disk tilts the means for supporting the magnetic disk relative to the direction of the magnetic field such that the axis of easy magnetization of the magnetic disk is inclined to the direction of the external magnetic field at an angle.

16. The degaussing device according to claim 10 further comprising a means for controlling the tilting means.

17. The degaussing device according to claim 13 further comprising a turning means for turning the magnetic disk about an axis of the support surface.

18. A method of fabricating a magnetic disk, comprising the steps of:
    forming a soft magnetic layer on a nonmagnetic substrate;
    forming a magnetic recording layer on the soft magnetic layer; and
    degaussing the magnetic recording layer;
    wherein the magnetic disk is placed in a degaussing device, and the magnetic disk is disposed such that the axis of easy magnetization of the magnetic disk is inclined at an angle to the direction of an external magnetic field.

* * * * *

UNITED STATES PATENT AND TRADEMARK OFFICE
CERTIFICATE OF CORRECTION

| | |
|---|---|
| PATENT NO. | : 7,724,490 B2 |
| APPLICATION NO. | : 11/789575 |
| DATED | : May 25, 2010 |
| INVENTOR(S) | : Tamura et al. |

It is certified that error appears in the above-identified patent and that said Letters Patent is hereby corrected as shown below:

On the Title Page, Item (75) Inventors: Correct inventor name from "Mitsuru Hamaguchi" to --Mitsuru Kitamura--

Column 7, Line 2: change "50" to --5°--

Column 7, Line 22: change "means for applying" to --a means for applying--

Signed and Sealed this
Thirteenth Day of September, 2011

David J. Kappos
*Director of the United States Patent and Trademark Office*